United States Patent [19]

Åström

[11] Patent Number: 5,579,372
[45] Date of Patent: Nov. 26, 1996

[54] FLOW CONTROL METHOD FOR SHORT MESSAGE SERVICE - BUSY SUBSCRIBER

[75] Inventor: Bo A. V. Åström, Stockholm, Sweden

[73] Assignee: Telefonaktiebolaget LM Ericsson, Stockholm, Sweden

[21] Appl. No.: 355,282

[22] Filed: Dec. 12, 1994

[51] Int. Cl.⁶ .................................................... H04Q 7/38
[52] U.S. Cl. ................................................ 379/58; 379/63
[58] Field of Search ................................. 379/58, 59, 60, 379/33.1, 33.2, 57, 56; 340/825.26, 825.27, 825.44, 825.47, 825.52

[56] References Cited

U.S. PATENT DOCUMENTS

| | | | |
|---|---|---|---|
| 4,519,068 | 5/1985 | Kreb et al. | 370/82 |
| 5,020,095 | 5/1991 | Morganstein et al. | |
| 5,155,761 | 10/1992 | Hammond. | |
| 5,166,974 | 11/1992 | Morganstein et al. | |
| 5,226,071 | 7/1993 | Bolliger et al. | |
| 5,251,250 | 10/1993 | Obata et al. | |
| 5,282,205 | 1/1994 | Kuznicki. | |
| 5,311,574 | 5/1994 | Livanos. | |
| 5,315,642 | 5/1994 | Fernandez. | |

FOREIGN PATENT DOCUMENTS

| | | |
|---|---|---|
| 9405124 | 3/1994 | Finland. |
| 9407338 | 3/1994 | Finland. |
| WO94/05124 | 3/1994 | WIPO. |
| WO94/07338 | 3/1994 | WIPO. |
| WO94/16532 | 7/1994 | WIPO. |

OTHER PUBLICATIONS

M. Hientz et al., "Der Short Message Service—Ein Neuer Dienst Der Digitalen Mobilkommunikation", *ITG Fachbericht 124. Mobile Kommunikation*, Sep. 1993 NEU–ULM, DE, pp. 517–526 XP 000443970.

GSM Technical Report 03.47, Version 4.1.0, pp. 1–56, Apr. 1993.

GSM Recommendation 03.40, Version 4.7.0. European Telecommunication Standard, ETS 300 536, pp. 1–103, Oct. 1993.

GSM Recommendation 09.02, Version 4.6.0, ETS 300 599, pertinent pages only, 1994.

GSM Recommendation 09.02, Version 4.6.0, ETS 300 599, pp. 295–308, 1994.

*Primary Examiner*—Curtis Kuntz
*Assistant Examiner*—Nay Aung Maung
*Attorney, Agent, or Firm*—Burns, Doane, Swecker & Mathis, L.L.P.

[57] ABSTRACT

A flow control system and method in a global system for mobile communication (GSM) mobile telephone system for short message service (SMS). The SMS enables short text messages to be sent to and from mobile stations. The system and method is directed to a control for a service for messages sent to MSs (MT-SMs) and in particular to the case when several SCs send MT-SMs to the same mobile station subscriber. When several SCs send MT-SMs to the same subscriber, the first SC that establishes a short message dialog is allowed to be fully completed. While the short message dialog for this SC is established, any other SC attempting to send MT-SMs are detected and stored in a waiting list. After the initial short message dialog is completed, the same radio connection is maintained and each of the short messages corresponding to the SC addresses stored in the waiting list are sent by a first in-first to send principle. More generally, the system and method controls messages sent by SMS during a busy condition which enable a better utilization of the network and the network entity resources.

22 Claims, 3 Drawing Sheets

Fig. 3

FLOW CONTROL METHOD FOR SHORT MESSAGE SERVICE - BUSY SUBSCRIBER

BACKGROUND

The present invention is directed to a global system for mobile communication (GSM) mobile telephone system which utilizes short message service (SMS) for sending short text messages to and from mobile stations. In particular, the present invention is directed to controlling the flow of short text messages to a mobile station after a busy condition is detected and several short message service centers for short messages attempt to send their messages to the same mobile station during the busy condition. Also, the present invention is directed to other standards such as personal communication system (PCS) 1900.

SMS for sending short text messages (hereinafter called SMs) to and from mobile stations (MSs) is presently used in GSM mobile telephone systems. To perform the SMS, at least a basic set of GSM public land mobile network (PLMN) entities or nodes must be used. The minimum set of entities includes a mobile services switching center (MSC), a visitor location register (VLR), a home location register (HLR), an SMS gateway MSC (SMS-GMSC) and an SMS S interworking MSC (SMS-WMSC). Another network entity that is not part of the GSM PLMN but is necessary for carrying out the SMS is a short message service center (hereinafter called SC).

FIG. 1 illustrates an example of conventionally used GSM PLMN entities. FIG. 1 includes an SC 10 for SMS connected to a GMSC/IWMSC 30 by a first interface 20, an HLR 50 connected to the GMSC/IWMSC 30 by an interface 40, an MSC/VLR 70 connected to the GMSC/IWMSC 30 by an interface 60 and an MS 90 connected to the MSC/VLR 70 by an interface 80. The SC 10 is a node which stores and forwards SMs over the interface 20, such as a known 03.47 protocol interface which is described in a GSM Technical Report, hereby incorporated by reference. The SC 10 communicates with the GMSC/IWMSC 30 which serve as the port into a PLMN and are, in most cases, the same node as illustrated in FIG. 1. The IWMSC portion of the GMSC/IWMSC 30 forwards SMs sent from MSs. The service for forwarding these SMs is called a mobile originated short message service (hereinafter called MO-SM). The GMSC portion of the GMSC/IWMSC 30 receives messages sent to MSs. The service for receiving these SMs is called a mobile terminated short message service (hereinafter called MT-SM). The HLR 50 stores subscriber data for subscribers having a subscription into a PLMN. The stored subscriber data may be location information, a directory number (MSISDN), radio numbering plan identification (IMSI), supplementary service profiles, teleservice profiles, etc.

The VLR portion of the MSC/VLR 70 controls service areas when an MS roams within or between PLMNs. In other words, at one specific time, the MS is roaming within one specific service area of the VLR. The VLR can best be described as a "copy" of the subscriber's HLR. For example, when registering the present location of an MS by sending a location update to the HLR, subscriber data stored in the HLR is transferred to the VLR. The VLR contains the data that is needed to establish calls and signal transactions towards a desired MS. The MSC portion of the MSC/VLR 70 performs call and transaction control by interworking with the VLR. The MSC is responsible for switching functions and controlling hardware when establishing a call or a signal connection. In particular, the MSC cooperates with a VLR where subscriber data for the call in question is stored. The MSC and VLR are illustrated as an integrated unit (node) for discussion purposes because the interface between the MSC and VLR is well known. The interfaces 40 and 60 between the GMSC/IWMSC 30, HLR 50 and MSC/VLR 70 are performed by a mobile application part (MAP) which is a signaling protocol used for roaming and handover signaling in GSM. The MSC also interfaces the radio network via a base station controller (BSC), not shown.

The flow of the SMs for MT-SM will be discussed with reference to FIG. 1. An MT-SM is sent over the interface 20 from the SC 10 to the GMSC/IWMSC 30. The MT-SM contains an SM which is to be delivered to the MS 90 and is identified by the MSISDN number contained in the MT-SM. The GMSC portion of the GMSC/IWMSC 30 interrogates the subscriber's HLR 50 for routing information before delivering the MT-SM to the MSC/VLR 70 where the MS 90 is roaming. The subscriber's MSISDN is used to find the HLR which is translated into a CCITT signaling system No. 7 address. This is a known MAP protocol used for this GSM cellular standard. The MAP message (operation) used to interrogate the HLR 50 is called "send routing information for SM." When the GMSC has received routing information, the MT-SM is forwarded to the MSC/VLR 70, which corresponds to where the MS 90 is roaming, in the "forward SM" MAP message (operation) over the interface 60. The MT-SM is delivered from the MSC/VLR 70 to the MS 90 over the interface 80 which is a known radio interface. This delivery is acknowledged back to the SC 10 mapped onto the "forward SM" MAP operation and onto the "03.47" protocol which interfaces the GMSC/IWMSC 30 with the SC 10.

For MT-SM, only one MT-SM dialog for each MS may be established according to GSM specifications over which several SMs may be sent. In contrast, one of several SMs may be delivered on the same dialog with the MS for MT-SM. Thereby, one MT-SM dialog can be used to send many SMs to the same MS and no fixed time for a MT-SM dialog can be set or estimated.

However, when using the SMS in known GSM mobile telephone systems, a problem occurs if several SCs send MT-SMs to the same MS subscriber at the same time. In this case, the SC originating the MT-SM which arrives first to the MSC/VLR where the subscriber is roaming will have an established SM-dialog with the MS. As a result, MT-SMs originated from other SCs cannot be delivered to the MS due to a "busy" condition in known systems (compare with a busy condition for a telephone call).

FIG. 2 illustrates the general structure for a plurality of SCs which may attempt to establish an MT-SM dialog with an MS 90. FIG. 2 illustrates a plurality of SCs for SMS $10_1$, $10_2$, ... $10_n$, which are respectively connected to a plurality of GMSC/IWMSCs $30_1$, $30_2$, ... $30_n$ by interfaces $20_1$, $20_2$, ... $20_n$. The plurality of GMSC/IWMSCs $30_1$, $30_2$, ... $30_n$ are connected to the MSC/VLR 70 by a plurality of interfaces $60_1$, $60_2$, ... $60_n$, respectively. To illustrate the problem when more than one SC tries to send an SM to the same MS 90, it is assumed that SC1 $10_1$ and the MS 90 have established an MT-SM dialog. Subsequently, if SC2 $10_2$ tries to establish an MT-SM dialog with the MS 90, a signal illustrating that the MS subscriber is busy is reported back to SC2 $10_2$ as either "a system failure" or "a SMS-busy." In GSM Phase 1, "a system failure" is reported back to SC2 $10_2$ which is a somewhat inappropriate report of the MS 90 status, but is nevertheless used. In the GSM Phase 2 Enhancement, the specification for this condition is reported back to the SC2 $10_2$ as "SMS-busy." When the MS 90 is determined to be in the busy condition, SMs from SC2 $10_2$ through SCn $10_n$ cannot establish an MT-SM dialog with MS 90. As a result, a congestion situation occurs for each of the SCs which have attempted to send an SM. When the MT-SM dialog between SC1 $10_1$ and MS 90 has been completed, the radio connection is released and each of the SCs having attempted to send SMs must re-establish a MT-SM dialog and a radio connection. Releasing the radio connection is not an efficient way to deliver the additional SMs to the MS 90.

As a starting point of a solution for this congestion situation, buffering the messages that arrive during the time when the MS 90 has already established an MT-SM dialog was considered by the present applicant. The implementation of such a buffering feature is fairly complicated because both the number of messages to buffer and the length of time must be handled. Also, it would be necessary to have a timer running in the SC that originates the SM and upon expiration, the sending of the MT-SM would be aborted by this SC. This timer would have to be coordinated with the time for buffering in the MSC/VLR. Another complication is that the timers would be specified as value ranges in the specifications, and thereby chosen and set differently by each operator. As a result of these problems, the present applicant determined that this buffering solution would not efficiently resolve the above-described congestion situation.

SUMMARY

An object of the present invention is to efficiently utilize the radio resources when delivering messages received from other service centers while a short message dialog is established between one service center and the mobile station by maintaining the same radio connection.

Another object of the present invention is to provide message control after a busy condition is detected between one service center and a desired mobile station as other messages are attempted to be sent by other service centers to the same mobile station by using the same radio connection for the other messages and allowing the other messages to be sent in the order that they have attempted to be sent.

A still further object of the present invention is to provide flow control for messages during busy conditions for a short message service which better utilizes the radio network, the switching center and the location register resources.

The objects of the present invention are fulfilled by providing a mobile telephone system for sending messages to and from mobile stations comprising a plurality of service centers for sending and receiving messages to and from the mobile stations and a switching center for detecting a message being sent to one of the mobile stations by one of the plurality of service centers while a message is attempted to be sent to the one mobile station by another one of the service centers and sequentially developing a list of each of the service centers attempting to send messages to the one mobile station.

The objects of the present invention are also fulfilled by providing a mobile telephone system for sending messages to and from mobile stations comprising a plurality of service centers for sending and receiving messages to and from the mobile stations, and a switching center for controlling messages during busy conditions for each of the service centers attempting to send messages while a message is being sent by one of the service centers.

The system, network and method according to the embodiments of the present invention provide control of the messages attempting to be sent after a message dialog is established between one service center and a desired mobile station. This flow control efficiently utilizes the radio resources by maintaining the same radio connection for sending the messages attempting to be sent by the other service centers while the message dialog is established between the one service center and the mobile station.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIG. 3 illustrates a flow diagram for controlling mobile terminated short messages to a desired mobile station in an embodiment of the present invention;

DETAILED DESCRIPTION

Figure 1:
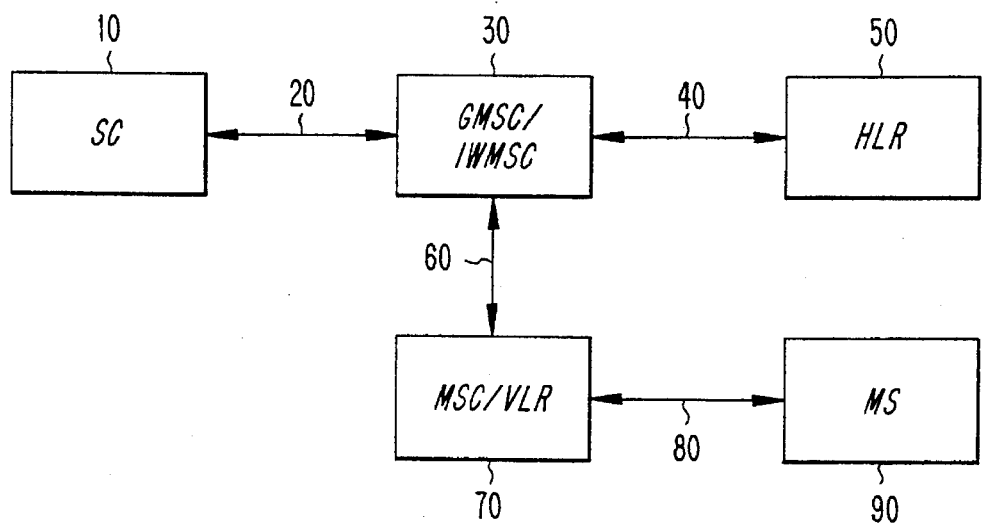
FIG. 1 illustrates the network entities necessary for performing short message services.
Figure 4:
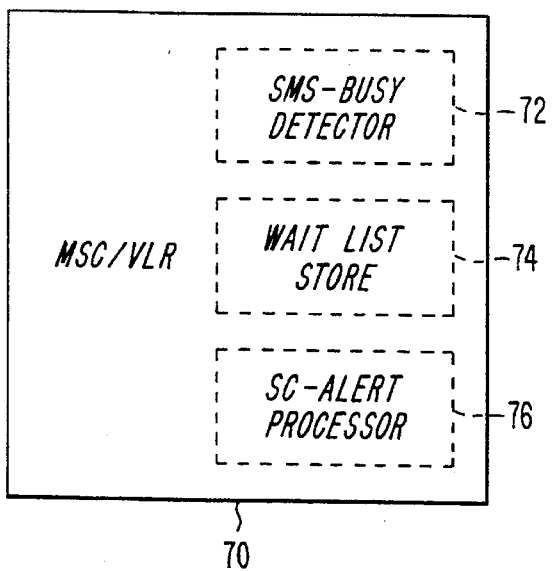
FIG. 4 illustrates the MSC/VLR unit in an embodiment of the present invention.
Figure 5:
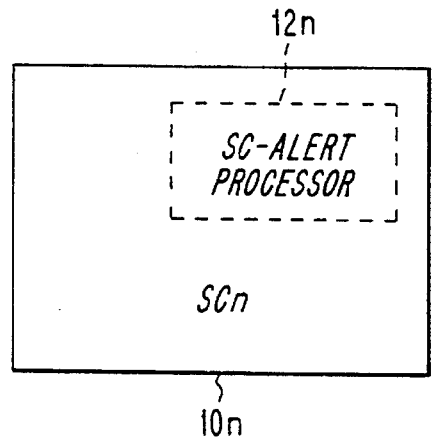
FIG. 5 illustrates the SC unit in an embodiment of the present invention.
Figure 2:
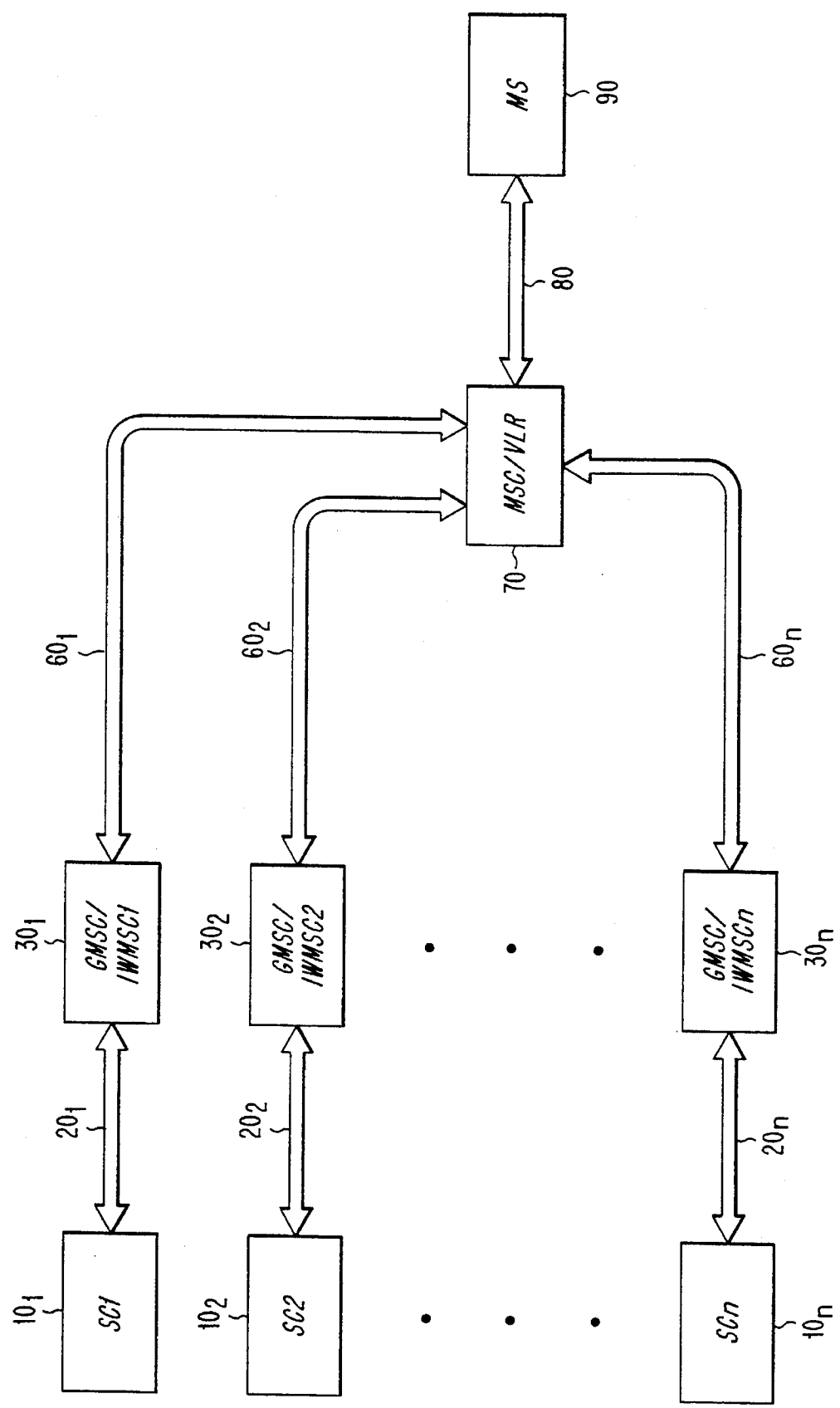
FIG. 2 illustrates a system where a plurality of service centers for short message services are interfaced with a mobile station.

The embodiments of the present invention will be described with respect to FIGS. 3–5 and in combination with FIG. 2. As described above in the conventional system, FIG. 2 illustrates a system where a plurality of service centers SC1 through SCn attempt to send short text messages to one desired mobile station. Even though the same Fig. is used to discuss the present embodiment, the operation of this system, and in particular, the operation of the MSC/VLR 70, differs in the present embodiment from the known system. The operation of this system will be further described in the control operation illustrated in FIG. 3. FIG. 4 illustrates the structure of the MSC/VLR 70 used in an embodiment of the present invention. The MSC/VLR 70 includes an SMS-Busy detector 72, a wait list storage 74 and an SC-alert processor 76. The SMS-Busy detector 72 detects when an SM-dialog has been established between an SC and MS. The wait list storage 74 registers the addresses of SCs attempting to send SMs while an SM-dialog (an SMS-Busy condition) has been established. The SC-Alert processor 76 determines when the SM-dialog has been completed for the SC and MS which have established the SM-dialog and develops an SC-Alert signal to alert the next SC in the wait list. FIG. 5 illustrates an SC used in an embodiment of the present invention where an SC-Alert processor $12_n$ is included in the $SC_n$ $10_n$. The SC-Alert processor $12_n$ interprets the SC-Alert signal sent from the MSC/VLR 70 and initiates sending of the SMs thereafter.

Figure 3:
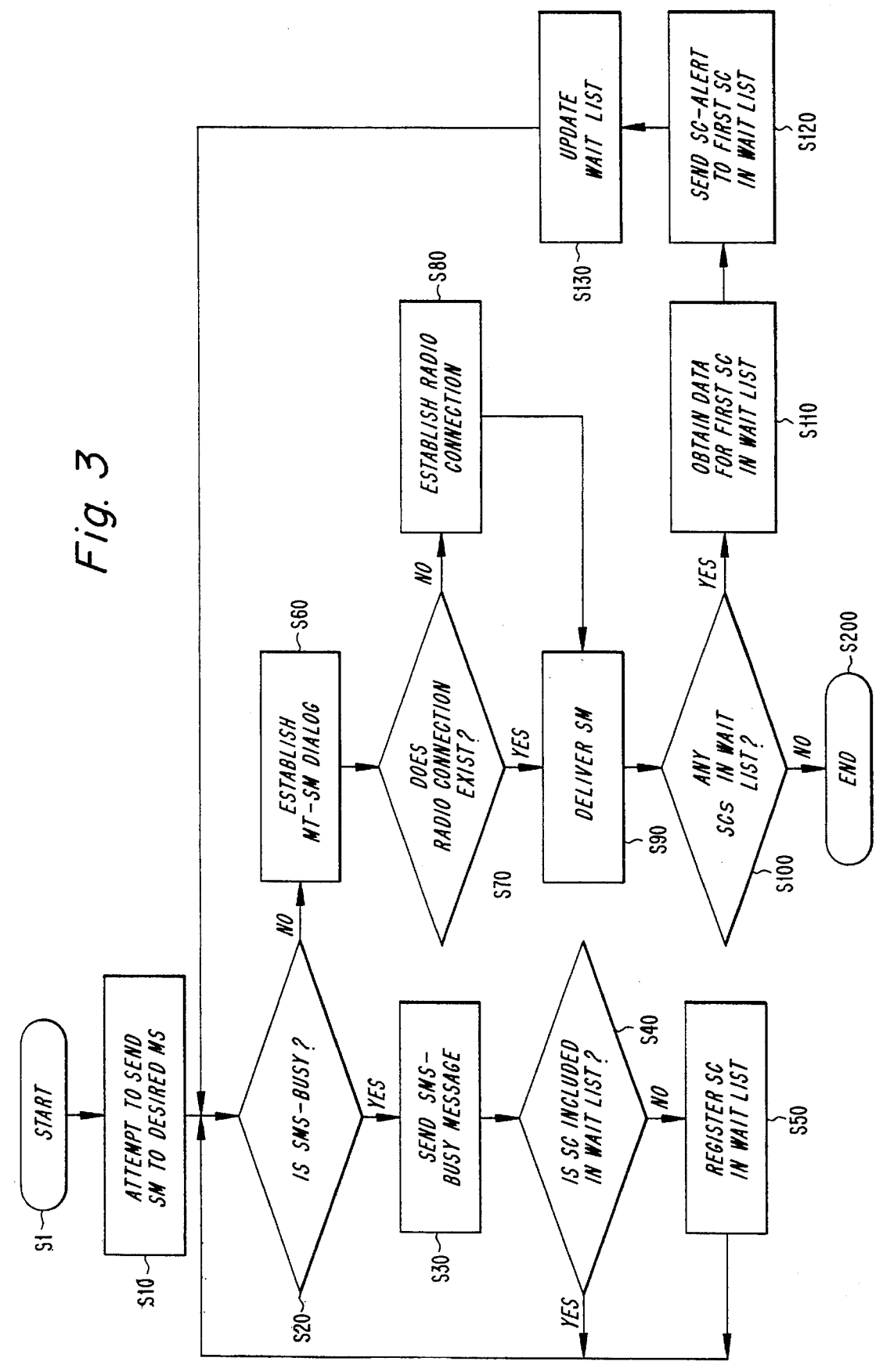

In FIG. 3, an SM is attempted to be sent from one of the SCs to a desired MS at step S10. For illustrative purposes, it will be assumed that the initial SM is sent from SC1 $10_1$ to MS 90. Because this is an MT-SM, the SM proceeds over the interface $20_1$, corresponding to the known "03.47" protocol interface to the GMSC portion of the GMSC/IWMSC1 $30_1$.

At step S20, the MSC/VLR 70 determines whether the MS 90 has already established an SM dialog with another of the SCs (whether an SMS-Busy condition exists). When the MS is determined to have established an SM dialog (an SMS-Busy condition exists) at step S20, an SMS-Busy message is sent to the SC attempting to establish an SM-dialog during the already established SM-dialog at step S30. Step S40 checks to determine if the address of the SC attempting to send the SM is already stored in a waiting list. If the SC address is determined as failing to be in the wait list at step S40, the SC address is registered in the wait list at step S50 before proceeding back to step S20. The waiting list compiled in the MSC/VLR 70 follows the principle where the SC address registered becomes the first SC address in the waiting list, the second SC address registered is the second SC address in the waiting list, etc. If the SC is determined to have been already registered in the waiting list at step S40, the flow proceeds back to step S20 without registering the SC-address again in the waiting list.

Whenever another SM-dialog is desired to be established, the flow begins again at step S20 for the next SM. As long as another SM is not attempted to be sent, the flow proceeds to step S20 where it is again determined whether the desired MS is still SMS-Busy. When no additional SMs are attempted to be sent while the desired MS is in a SMS-Busy condition, a waiting loop of steps S20, S30, and S40 is cycled through until the SM-dialog has been completed. In effect, the system is waiting for the established SM-dialog to be completed and registers a waiting list of the SC address attempting to send SMs to the desired MS while this SM-dialog is established.

After establishing the radio connection and delivering the SM to the desired SM, the flow proceeds to step S100 where it is determined whether any SC addresses are in the waiting list. If there are no SC addresses in the waiting list, the control operation ends. However, if at least one other SC address is in the waiting list, the flow process to step S110. At step S110 the data for the first SC in the waiting list is obtained. Then, an SC-Alert signal is sent to the first SC address in the waiting list at step S120. When it is determined at step S20 that the desired MS is not SMS-Busy, the flow proceeds to step S60.

A determination is made at step S70 on whether a radio condition exists with the desired MS. If it is determined that a radio connection does not exist, a radio connection is established at step S80 before proceeding to step S90 where the SM is delivered to the desired MS over the newly established radio connection. If the radio connection is determined to be existing at step S70, the radio connection which has been established for the previous SM-dialog is not released and the SM is delivered to the desired MS over the same radio connection. By alerting the first SC address in the waiting list, the SMs corresponding to this SC now attempts to establish an SM-dialog for sending the SM to the desired MS. Alerting is performed by using a GSM MAP (09.02) operation in a new context. The known operation performed by the GSM MAP (09.02) is SC-Alert which is herein incorporated by reference. The SC-Alert operation is normally used by an HLR to alert SCs when a subscriber becomes available after having not been reachable such as in power-off conditions, no radio coverage, etc. However, the SC-Alert operation is sent by the MSC/VLR instead of the HLR in the present embodiment. This action performed by the MSC/VLR is not specified by GSM but does not meet any compatibility problems within a PLMN. The SC-Alert operation is simply forwarded to the SC indicated by the SC-address via the IWMSC portion of the GMSC/IWMSC corresponding to the SC. The SC-Alert signal received by the SC is used as a trigger to resend the SMs which have failed to be delivered due to the "SMS-busy" or "system failure."

Next, the waiting list is updated at step S130 by deleting the SC address that has just been obtained at step S110 from the waiting list so that the second entry in the waiting list, if any entry, exists, now becomes the first entry in the waiting list. Then, the flow control proceeds to step S20 where the control determines whether the SMS-Busy condition exists. When the SMS-Busy condition fails to exist and the control proceeds from step S20 to step S60, the SMs are sent from the SC receiving the SC-Alert signal.

This system and flow control method essentially controls messages sent to a desired MS during a SMS-Busy condition for enabling a better utilization of the radio network and MSC/VLR resources since the same radio connection is used for a plurality of MT-SMs received from other SCs. As a result, paging, authentication, and ciphering can be avoided for subsequent MT-SM transfers. The embodiments described are also applicable to other standards such as PCS 1900.

The invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

What is claimed is:

1. A mobile telephone system for sending messages to and from mobile stations comprising:

a plurality of service centers for sending and receiving messages to and from the mobile stations; and a switching center for establishing a message dialog and detecting message busy conditions for a message being sent to one of the mobile stations by one of said plurality of service centers while a message is attempted to be sent to the one mobile station by another of said service centers and sequentially developing a list of addresses for each of said service centers attempting to send messages to the one mobile station, wherein said switching center sequentially sends an alert signal to each of said service centers in said list upon completion of sending messages by said one service center until each of said service centers in said list is exhausted.

2. A mobile telephone system according to claim 1, wherein said service centers send said messages responsive to receiving said alert signal so as to use the same radio connection to one mobile station for all consecutive messages.

3. A mobile telephone system according to claim 1, wherein said alert signal is sent to said service centers via an interworking switching center and addresses corresponding to said service centers from said switching center.

4. A mobile telephone system according to claim 1, wherein the messages comprise short text messages.

5. A mobile telephone system for sending messages to and from mobile stations comprising:

a plurality of service centers for sending and receiving messages to and from the mobile stations;

a switching center for controlling messages sent by message services of said service centers during a busy condition while a message is being sent by one of said service centers, said switching center including a mobile services switching center and a visitor location register for performing call and transaction control and compiling a waiting list of addresses for each of said service centers which have attempted to send messages during said busy condition; and wherein said mobile services switching center and said visitor location register develop an alert signal after completion of sending a message to one of said service centers, and said alert signal is sent to the next of said service centers in said waiting list to initiate sending of a message associated with the next of said service centers so that the same radio connection is maintained for each of said service centers in said waiting list.

6. A mobile telephone system according to claim 5, wherein said switching center further comprises:

a plurality of gateway mobile services switching centers corresponding to said service centers for passing through messages generated at said service centers onto the mobile stations;

a plurality of interworking mobile services switching centers corresponding to said service centers for passing through messages generated at the mobile stations onto said service centers; and a home location register for storing subscriber data and routing information.

7. A mobile telephone system according to claim 6, wherein said home location register comprises location information, directory numbers, radio numbering plan identification, supplementary service profiles and teleservices profiles.

8. A mobile telephone system according to claim 6, wherein said service centers are connected with said gateway mobile services switching centers and said interworking mobile services switching centers by interfaces based on GSM 03.47 protocol.

9. A mobile telephone system according to claim 6, wherein said mobile services switching center and said visitor location register are connected with the mobile stations by radio interfaces.

10. A mobile telephone system according to claim 6, wherein the messages comprise short text messages.

11. A network for sending messages between mobile stations and message service centers comprising:

a first mobile switching center for receiving the messages from the message service centers;

a second mobile switching center operatively communicative with said first mobile switching center for establishing an initial message dialog between one of the message service centers and one of the mobile stations and developing a busy signal upon establishing said initial message dialog with said one mobile station; and a register for registering addresses in order for others of the message service centers which attempt to establish subsequent message dialogues with said one mobile station and sending an alert signal from said second mobile switching center to the others of the message service centers registered in said register for establishing subsequent message dialogues with the same radio connection for said one mobile station in the registered order after said initial message dialog is completed.

12. A network according to claim 11, wherein said first mobile switching center comprises a plurality of gateway and interworking centers corresponding to each of said message service centers.

13. A network according to claim 11, wherein said first mobile switching center comprises a plurality of gateway and interworking centers which correspond to at least one and to a selective plurality of said message service centers.

14. A network according to claim 11, wherein the messages comprise short text messages.

15. A method for sending messages between mobile stations and message service centers comprising the steps of:

(a) receiving messages from the message service centers by a plurality of first mobile switching centers corresponding to each of said message service centers;

(b) establishing an initial message dialog between one of the message service centers and one of the mobile stations by a second mobile switching center operatively communicative with said plurality of first mobile switching centers;

(c) developing a busy signal upon establishing said initial message dialog with said one mobile station for sending to the message service centers attempting to establish subsequent message dialogues with said one mobile station;

(d) registering addresses in order for others of the message service centers which attempt to establish subsequent message dialogues with said one mobile station after said initial message dialog is completed; and (e) sending an alert signal from said second mobile switching center to the others of the message service centers registered at said step (d) for establishing subsequent message dialogues with the same radio connection for said one mobile station in the order registered at said step (d).

16. A method according to claim 15, wherein the messages comprise short text messages.

17. A method for sending messages between mobile stations and message service centers comprising the steps of:

(a) a mobile switching center for establishing an initial message dialog between one of the message service centers and one of the mobile stations;

(b) developing a busy signal upon establishing said initial message dialog at said step (a);

(c) registering addresses in order for others of the message service centers which attempt to establish subsequent message dialogues with said one mobile station; and (d) sending an alert signal from said mobile switching center to the others of the message service centers registered at said step (c) for establishing subsequent message dialogues with the same radio connection for said one mobile station in the order registered at said step (c).

18. A method according to claim 17, wherein the messages comprise short text messages.

19. A network for sending messages between mobile stations and message service centers comprising:

a mobile switching center for establishing an initial message dialog between one of the message service centers and one of the mobile stations and developing a busy signal upon establishing said initial message dialog with said one mobile station; and a register for registering addresses in order for others of the message service centers which attempt to establish subsequent message dialogues with said one mobile station and sending an alert signal from said mobile switching center to the others of the message service centers registered in said register for establishing subsequent message dialogues with the same radio connection for said one mobile station in the registered order.

20. A network according to claim 19, wherein the messages comprise short text messages.

21. A method for sending messages to and from mobile stations comprising the steps of:

(a) sending and receiving messages to and from the mobile stations by a plurality of service centers;

(b) a mobile switching center for controlling messages sent by message services of said service centers during a busy condition while a message is being sent by one of said service centers by compiling a waiting list of addresses for each of said service centers which have attempted to send messages during said busy condition;

(c) said mobile switching center developing an alert signal after completion of sending messages to said one service center and to each of said service centers in said waiting list; and (d) said mobile switching center sequentially sends said alert signal to each of said service centers in said waiting list to initiate sending of messages to each of said service centers in said waiting list while maintaining the same radio connection.

22. A method according to claim 21, wherein the messages comprise short text messages.

* * * * *